(12) United States Patent
Tanaka et al.

(10) Patent No.: US 6,776,371 B2
(45) Date of Patent: Aug. 17, 2004

(54) METHOD OF MANUFACTURING A COMPOSITE MATERIAL WING AND A COMPOSITE MATERIAL WING

(75) Inventors: Shigeki Tanaka, Tokyo (JP); Atsushi Harada, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/233,087

(22) Filed: Aug. 30, 2002

(65) Prior Publication Data

US 2003/0042364 A1 Mar. 6, 2003

(30) Foreign Application Priority Data

Sep. 3, 2001 (JP) .................................. P.2001-265850

(51) Int. Cl.[7] .............................. B64C 3/20; B64C 3/26
(52) U.S. Cl. ................... 244/117 R; 244/123; 156/182; 29/897.2
(58) Field of Search ........................... 244/117 R, 123, 244/132; 156/182, 244.13, 358; 29/897.2

(56) References Cited

U.S. PATENT DOCUMENTS

| | | | | |
|---|---|---|---|---|
| 1,835,532 A | * | 12/1931 | Semmes | ..................... 244/123 |
| 2,248,520 A | * | 7/1941 | Woods | ........................ 244/123 |
| 6,237,873 B1 | * | 5/2001 | Amaoka et al. | ............. 244/123 |
| 2001/0051251 A1 | | 12/2001 | Noda et al. | .................. 428/119 |

FOREIGN PATENT DOCUMENTS

EP        1074466 A1    2/2001    ............. B64C/3/18

\* cited by examiner

*Primary Examiner*—Robert P. Swiatek
(74) *Attorney, Agent, or Firm*—Darby & Darby (57) ABSTRACT

An lower skin portion structure is integrally molded by employing a front spar and a rear spar having rib posts, lower stringers, a lower skin prepreg, and lower rib chord prepregs, then an upper skin portion structure is integrally molded by employing upper stringers, an upper skin prepreg, and upper rib chord prepregs, then ribs are fastened to the rib posts and the lower rib chords of the lower skin portion structure by mechanical fastening device, and then the lower skin portion structure and the upper skin portion structure are coupled by fastening the upper skin portion structure to the front spar and the rear spar by fasteners and then fastening upper rib chords of the upper skin portion structure to the ribs by the mechanical fastening device, whereby a composite material wing is manufactured.

3 Claims, 5 Drawing Sheets

METHOD OF MANUFACTURING A COMPOSITE MATERIAL WING AND A COMPOSITE MATERIAL WING

BACKGROUND OF THE INVENTION

1. Filed of this Invention

The present invention relates to a method of manufacturing a composite material wing and a composite material wing and, more particularly, a method of manufacturing a composite material wing for fastening a lower skin portion structure and an upper skin portion structure via mechanical fastening device and a composite material wing that can be manufactured by this manufacturing method. The description of Japanese Patent Application No. 2001-165850 filed on Sep. 3, 2001 including the specification, drawings and abstract is incorporated by reference in its entirely.

2. Description of Related Art

In recent years, in many cases a wing box structure of the main wing of the aircraft is manufactured by employing not only the metallic material but also composite material made of the lightweight/high strength fiber reinforced plastic (referred simply to as the "composite material" hereinafter) For example, there is the method of manufacturing the wing box structure of the main wing by fabricating separately upper/lower skins, front/rear spars, the stiffening members such as the stringers, etc., which constitute the wing box structure, and the coupling members such as the shear tie, etc. by the composite material, and then fastening or adhering such members by virtue of the mechanical fastening device such as bolts, nuts, pins, rivets, etc. (referred to as the "fasteners" hereinafter) or the adhesive.

Also, there is the method of manufacturing the wing box structure of the main wing by integrally fabricating the front portion of the wing box structure, which is constructed by the front spar, the skin, and the stiffening members (referred to as the "front spar structure" hereinafter), and the rear portion of the wing box structure, which is constructed by the rear spar, the skin, and the stiffening members (referred to as the "rear spar structure" hereinafter), respectively by virtue of the resin-impregnating curing method such as the RTM (Resin Transfer Molding) method or the RFI (Resin Film Infusion) method, and then fastening these parts by means of the fasteners.

However, according to the method of manufacturing the wing box structure of the main wing by fabricating separately respective parts such as the skins, the front and rear spars, the stiffening members, the coupling members, etc. by the composite material and then fastening these parts by means of the fasteners, the curing/molding process often becomes different for different parts. For this reason, it takes much time to fabricate/prepare a variety of parts by the limited equipment so that the production cycle is prolonged.

Also, according to the method of fabricating separately the above parts by the composite material and then fastening these parts by means of the fasteners, the clearances are often generated in the fastened portions between respective parts (e.g., the fastened portion between the spar and the skin, the fastened portion between the skin and the stiffening members, etc.). Since the wing box structure of the main wing is also used as the fuel tank, the sealing process must be applied to fill such clearances, or shapes of neighboring portions of the fastened portions between respective parts must be repaired. Therefore, it takes much time and labor to execute the fine adjustment or the alignment prior to the fastening operation and as a result the cost of production is increased.

While, according to the method of manufacturing the wing box structure of the main wing by fabricating separately the parts by the composite material respectively and then adhering these parts by means of the adhesive, like the above fastening method by using the fasteners, it takes much time to fabricate/prepare a variety of parts by the limited equipments and thus the production cycle is prolonged. Also, according to the method of adhering respective parts by means of the adhesive, the clearances are also generated in the adhered portion between respective parts. Since such clearances must be filled with the adhesive, it takes much time and labor as a result the cost of production is increased.

Also, according to the method of manufacturing the wing box structure of the main wing by fabricating integrally the front spar structure and the rear spar structure by employing the resin-impregnating curing method respectively and then fastening these structures by means of the fasteners, the front spar structure and the rear spar structure have large and complicated cavities therein and therefore special split core jigs are needed to mold such cavities. Thus, the cost of fabricating the special core jigs is increased. Also, the mold-releasing process must be applied to the special split core jigs prior to the manufacture of the front spar structure and the rear spar structure, and also the special split core jigs must be separated and cleaned after the manufacture. As a result, the cost of production is increased.

SUMMARY OF THE INVENTION

It is a subject of the present invention to provide a method of manufacturing a composite material wing capable of reducing the labor and the assembling man-hour required for the manufacture to thus shorten the production cycle and reduce the production cost considerably, and a composite material wing that can be manufactured by this manufacturing method.

In order to achieve the above subject, as shown in FIG. 1 to FIG. 5, for example, the invention set forth in a first aspect of the present invention provides A method of manufacturing a composite material wing comprising: a lower skin portion structure manufacturing step of manufacturing a lower skin portion structure that contains a lower skin, a front spar, a rear spar, a lower stringer and a lower rib chord for stiffening the lower skin; an upper skin portion structure manufacturing step of manufacturing an upper skin portion structure that contains an upper skin, an upper stringer and an upper rib chord for stiffening the upper skin; and an upper and lower skin portion structure fastening step of fastening the lower skin portion structure and the upper skin portion structure; wherein the lower skin portion structure manufacturing step includes, a front spar molding step of molding a front spar, which has at least one front rib post that projects toward a wing rear side at predetermined position, in a state that a thermosetting resin is primarily cured, a rear spar molding step of molding a rear spar, which has at least one rear rib post that projects toward a wing front side at position opposing to the predetermined position, in the state that the thermosetting resin is primarily cured, a lower stringer molding step of molding the lower stringer for stiffening the lower skin in the state that the thermosetting resin is primarily cured, a lower rib chord prepreg laminating step of laminating a lower rib chord prepreg that are provided vertically along an inner shape of the lower skin in a chord direction at wing positions at which the rib post is positioned, a lower skin prepreg laminating step of laminating an lower skin prepreg on a lower molding jig that has an under surface shape of the wing, an arranging step of arranging the front spar, the rear spar, the lower stringer, and the lower rib chord prepreg on the lower skin prepreg via an adhesive respectively, a covering step of covering the lower skin prepreg, the front spar, the rear spar, the lower stringer, and the lower rib chord prepreg with a covering device, and a curing and molding step of exhausting, pressurizing, and heating portions that are covered with the covering device, the upper skin portion structure manufacturing step includes, an upper stringer molding step of molding the upper stringer for stiffening the upper skin in the state that the thermosetting resin is primarily cured, an upper rib chord prepreg laminating step of laminating upper rib chord prepreg that is provided vertically along an inner shape of the upper skin in the chord direction at wing position at which the rib post is positioned, an upper skin prepreg laminating step of laminating an upper skin prepreg on an upper skin jig having an upper surface shape of the wing, an arranging step of arranging the upper stringer and the upper rib chord prepreg on the upper skin prepreg via the adhesive, a covering step of covering the upper skin prepreg, the upper stringer, and the upper rib chord prepreg with the covering device, and a curing and molding step of exhausting, pressurizing, and heating portions that are covered with the covering device, and the upper and lower skin portion structures fastening step includes, a rib fabricating step of fabricating ribs each having a predetermined shape by a composite material or a metal, a first rib fastening step of fastening the ribs to the front rib post and the rear rib post and the lower rib chords of the lower skin portion structure by mechanical fastening device, an upper and lower fastening step of fastening spar of the lower skin portion structure, to which the ribs are coupled, to the skin of the upper skin portion structure by the mechanical fastening device, and a second rib fastening step of fastening the ribs to the upper rib chords of the upper skin portion structure by mechanical fastening device.

According to the invention as set forth in the first aspect of the present invention, there are provided the step of manufacturing the front/rear spars, the lower stringers, the lower skin prepreg, and the lower rib chord prepregs, which are primarily cured, by virtue of the so-called co-bonding method and also the step of manufacturing the upper skin portion structure by using the upper stringers, the upper skin prepreg, and the upper rib chord prepregs, which are primarily cured, by virtue of the so-called co-bonding method. Therefore, the time and labor that are required for manufacturing/preparing separately the parts such as the under/upper skins, the front/rear spars, the rib chords, etc., which have the different curing process, can be reduced. As a result, the production cycle of the composite material wind can be reduced considerably.

Also, according to the invention set forth in the first aspect, there are provided the step of manufacturing the front/rear spars, the lower stringers, the lower skin prepreg, and the lower rib chord prepregs, which are primarily cured, by virtue of the so-called co-bonding method and also the step of manufacturing the upper skin portion structure by using the upper stringers, the upper skin prepreg, and the upper rib chord prepregs, which are primarily cured, by virtue of the so-called co-bonding method. Therefore, because of the flexibility of the prepregs, the clearance is never generated in the fastened portions between respective manufactured parts, for example, the fastened portions of the front/rear spars and the skins, the fastened portions between the stringers and the skin.

Accordingly, the operation of fastening respective parts by the fasteners, the sealing process of burying the clearances in the fastened portions of respective parts, the operation of repairing the shapes of respective parts near the fastened portions, the operation of adhering respective parts by the adhesive, and the operation of burying the clearances in the fastened portions between the parts by the adhesive can be eliminated. Therefore, the time and labor required for these operations can be reduced. As a result, the cost of production of the composite material wing can be reduced considerably.

In addition, according to the invention set forth in The first aspect of the present invention, there are provided the step of manufacturing the front/rear spars, the lower stringers, the lower skin prepreg, and the lower rib chord prepregs, which are primarily cured, by virtue of the so-called co-bonding method and also the step of manufacturing the upper skin portion structure by using the upper stringers, the upper skin prepreg, and the upper rib chord prepregs, which are primarily cured, by virtue of the so-called co-bonding method. Therefore, there is no necessity to employ the special split core jigs when the lower skin portion structure and the upper skin portion structure are manufactured. Accordingly, the cost of fabricating the special split core jigs can be reduced. Also, the mold-releasing process of the special core jigs and the splitting/cleaning operations of the special core jigs can be omitted. As a result, the cost of production of the composite material wing can be reduced extremely.

Further, according to the first aspect, there are provided the step of manufacturing the front/rear spars having the rib posts and the lower skin portion structure and the upper skin portion structure having the rib chords and also the step of fastening the lower skin portion structure and the upper skin portion structure by using the rib posts and the rib chords as the fastening portions to the ribs. Therefore, the step of manufacturing the composite material wing can be simplified considerably.

In the invention set forth in a second aspect of the present invention, a method of manufacturing a composite material wing according to the first aspect, wherein the front spar and the rear spar that molded in the primarily-cured state are manufactured by an RTM method and an RFI method.

According to the second aspect of the present invention, not only the advantages of the invention set forth in the first aspect can also be achieved, but also the high quality front/rear spars can be effectively manufactured since the RTM method or the RFI method is employed without the employment of the prepreg when the front spar and the rear spar are to be molded in the primarily cured state. As a result, the high quality composite material wing can be effectively manufactured.

Figure 1:
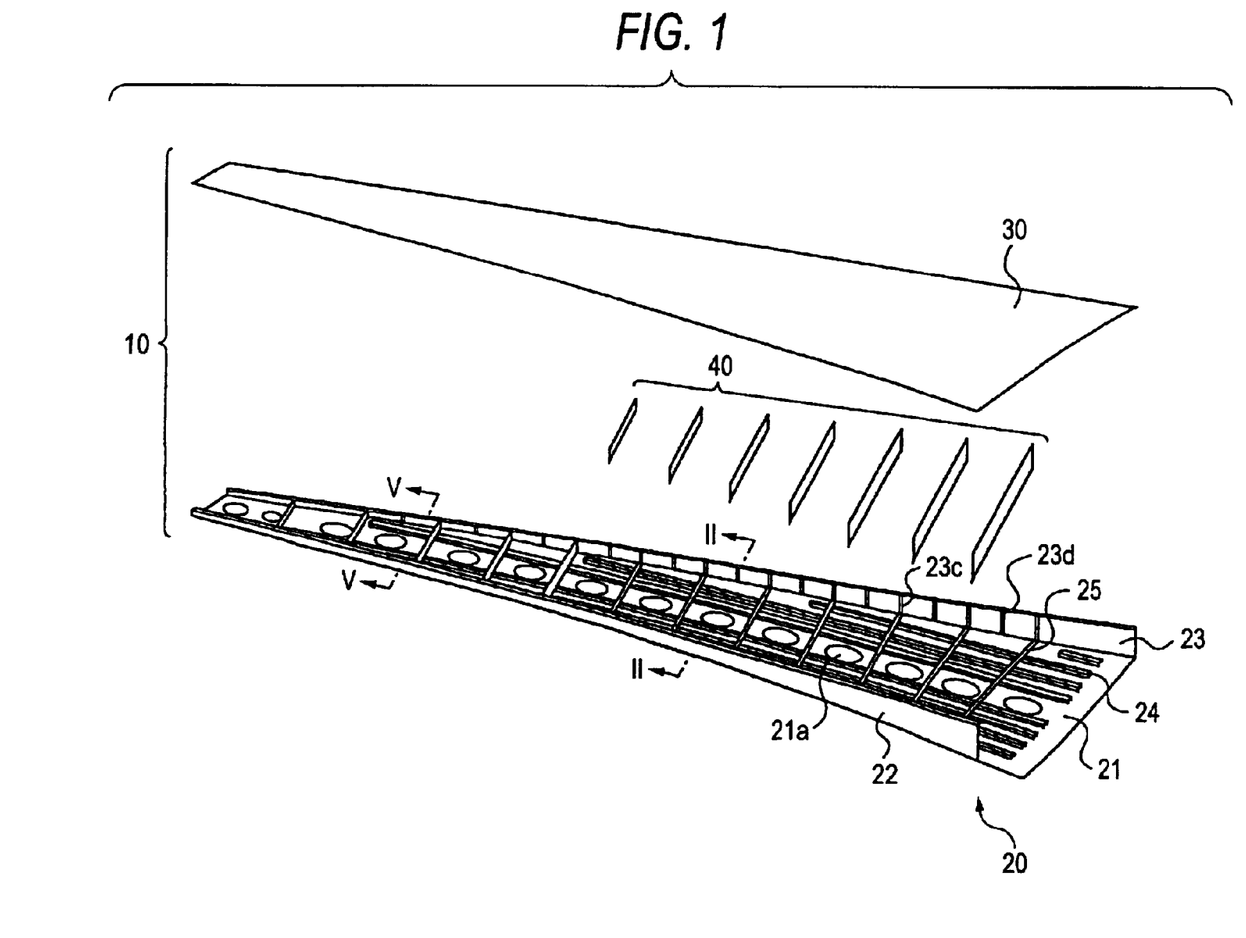
FIG. 1 is a perspective view showing a wing box structure of a composite material wing according to an embodiment of the present invention to show the state before an upper skin portion structure and a lower skin portion structure are fastened via ribs.

As shown in FIG. 1, for example, the invention set forth in a third aspect of the present invention provides a composite material wing comprising: a front spar and a rear spar; a lower skin that is jointed integrally to the front spar and the rear spar by an adhering device; an upper skin that is fastened to the front spar and the rear spar by mechanical fastening device; a plurality of stringers that are jointed integrally to inner surfaces of the lower skin and the upper skin by the adhering device to extend in a wing span direction; and ribs that are fastened to members that are integrally jointed to the front spar, the rear spar, the lower skin, and the upper skin respectively by mechanical fastening device.

In the composite material wing according to the invention set forth in the third aspect of the present invention, the stringers are jointed integrally to the lower skin and the upper skin by the adhering device, and also the front spar and the rear spar and the lower skin are integrally molded by the adhering device. Therefore, the strength can be assured sufficiently, and also the sealing process of filling the clearances in the fastened portions between respective parts, the operation of repairing the shapes of respective parts near the fastened portions, the operation of adhering respective parts by the adhesive, and the operation of filling the clearances in the fastened portions between the parts by the adhesive can be eliminated. As a result, the time and labor required for these operations can be reduced, and also the cost of production can be reduced considerably.

BRIEF DESCRIPTION OF THE DRAWINGS

FIGS. 4A and 4B are views showing the composite material wing box structure manufacturing method according to the embodiment of the present invention, wherein

DETAILED DESCRIPTION OF THE PREFERRED EMBODIMENTS

An embodiment of the present invention will be explained in detail with reference to the drawings hereinafter. In the present embodiment, a method of manufacturing a main wing of an aircraft will be explained hereunder. A main wing manufactured by the manufacturing method according to the present embodiment has a box beam type wing box structure 10 that is constructed by fastening a lower skin portion structure and an upper skin portion structure 30 via ribs 40 (see FIG. 1).

The lower skin portion structure 20 is a structure that is made of a composite material and has a lower skin 21, a front spar 23, a rear spar 22, lower stringers 24, and lower rib chords 25. The lower skin portion structure 20 constitutes the box-type wing box structure 10 when it is fastened to the upper skin portion structure 30 via the ribs 40. The lower skin 21 is a member that receives an aerodynamic force applied to the under surface of the main wing, and its surface shape is formed as a surface shape of the under surface of the main wing.

Figure 2:
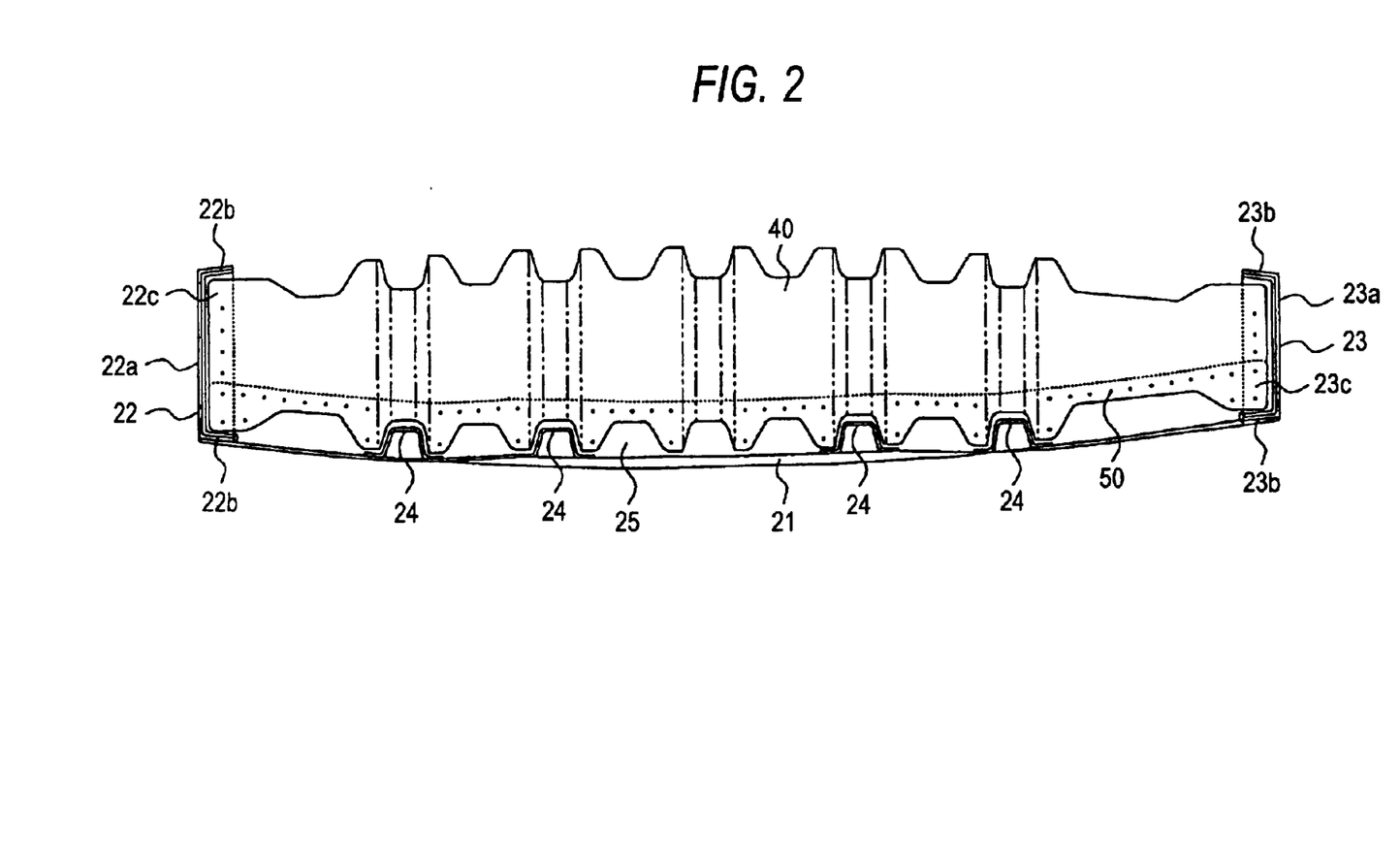
FIG. 2 is an enlarged sectional view of a II—II portion in the state that the ribs are fastened to the lower skin portion structure shown in FIG. 1.

The front spar 22 and the rear spar 23 are members that are fitted in front of and at the back of the lower skin 21 respectively and receive the bending load, the shearing load, and the torsion load that are applied to the main wing. As shown in FIG. 2, the front spar 22 and the rear spar 23 have webs 22a, 23a and flanges 22b, 23b respectively. Rib posts 22c, 23c are provided between both flanges 22b, 23b of the front spar 22 and the rear spar 23 respectively.

The rib posts 22c, 23c are portions that function when the lower skin portion structure 20 is fastened to the upper skin portion structure 30 via the ribs 40, and the ribs 40 described later are fastened to the rib posts 22c, 23c, as shown in FIG. 2. Also, stiffening stiffeners (23d) are provided to the webs 22a, 23a of the front spar 22 and the rear spar 23 (see FIG. 1).

The lower stringers 24 are a long member that extends in the length direction of the lower skin 21 (i.e., the span direction of the main wing), and a plurality of lower stringers 24 are fitted to be aligned in the width direction of the lower skin 21 (i.e., the chord direction of the main wing) (see FIG. 1). The lower stringers 24 are a stiffening member for stiffening the span direction of the main wing, and show a hat-type sectional shape in the present embodiment when it is cut perpendicularly to the length direction (see FIG. 2).

The lower rib chords 25 are a member that extends in the width direction of the lower skin 21 (i.e., the chord direction of the main wing), and a plurality of lower rib chords 25 are aligned in the length direction of the lower skin 21 (i.e., the span direction of the main wing) and fitted on the upper side of the lower stringers 24 (see FIG. 1 and FIG. 2). These lower rib chords 25 are portions that function when the lower skin portion structure 20 is fastened to the upper skin portion structure 30, and the ribs 40 described later are fastened to the lower rib chords 25, as shown in FIG. 2.

The upper skin portion structure 30 is a structure that is made of a composite material and has an upper skin 31, upper stringers 34, and upper rib chords 35, and constitutes the wing box structure 10 when it is fastened to the above lower skin portion structure 20. The upper skin 31 is a member for receiving the aerodynamic force that is applied to an upper surface of the main wing, and its surface shape is formed as a surface shape of the upper surface of the main wing.

Figure 5:
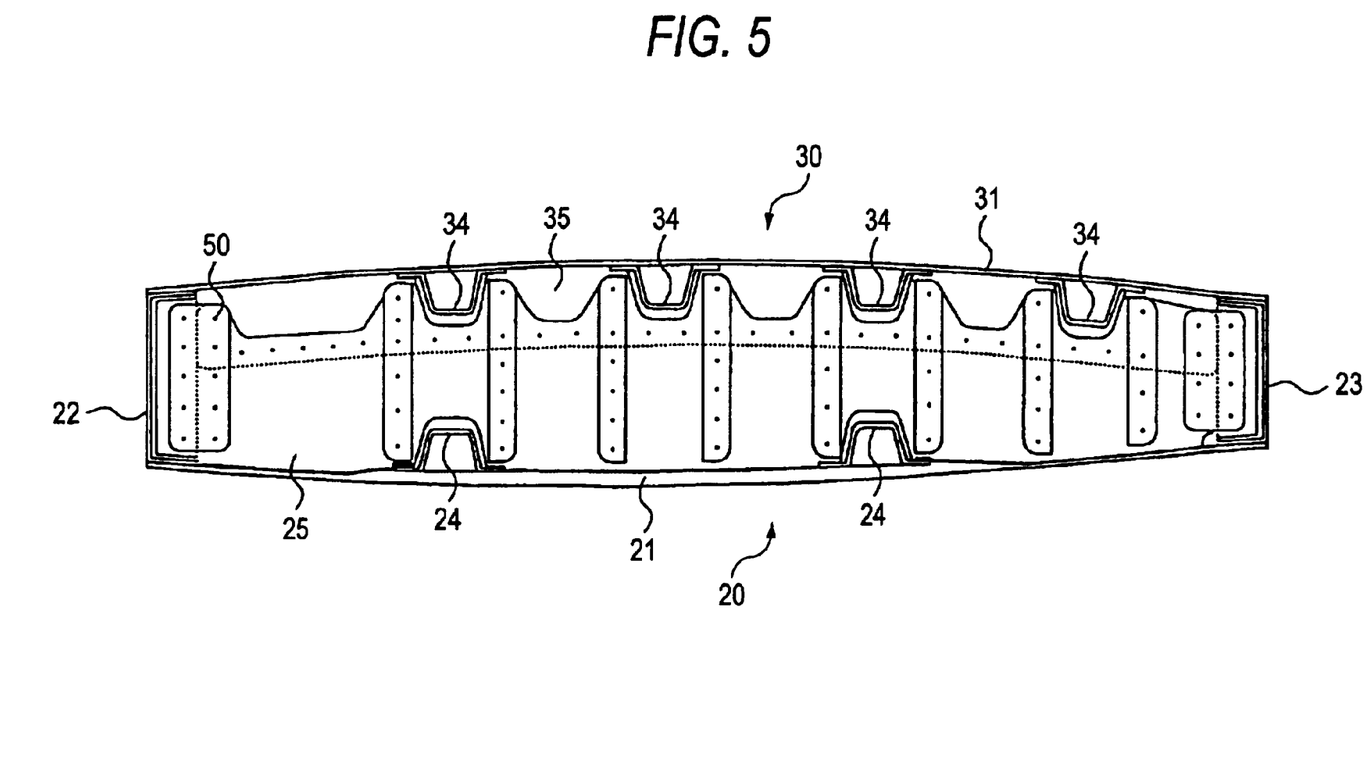
FIG. 5 is an enlarged sectional view of a V—V portion (wind tip neighboring portion) in the state that the upper skin portion structure is fastened to the lower skin portion structure shown in FIG. 1 (without the intervention of the ribs).

The upper stringers 34 are a long member that extends in the length direction of the upper skin 31 (i.e., the span direction of the main wing), and a plurality of upper stringers 34 are fitted to be aligned in the width direction of the upper skin 31 (i.e., the chord direction of the main wing) (see FIG. 5). The upper stringers 34 are a stiffening member for stiffening the span direction of the main wing together with the lower stringers 24, and show the hat-type sectional shape in the present embodiment when it is cut perpendicularly to the length direction (see FIG. 5).

The upper rib chords 35 are a member that extends in the width direction of the upper skin 31 (i.e., the chord direction of the main wing), and a plurality of upper rib chords 35 are aligned in the length direction of the upper skin 31 (i.e., the span direction of the main wing) and fitted on the upper side of the upper stringers 34 (see FIG. 5). The upper rib chords 35 are portions that function when the upper skin portion structure 30 is fastened to the lower skin portion structure 20, and the ribs 40 described later are fastened to the upper rib chords 35.

The lower skin portion structure 20 and the upper skin portion structure 30 are fastened together via the ribs 40 to constitute the wing box structure 10. More particularly, the ribs 40 are fastened to the rib posts 22c, 23c of the front spar 22 and the rear spar 23 and the lower rib chords 25 by fasteners 50, and then the upper rib chords 35 of the upper skin portion structure 30 are fastened to the ribs 40 by the fasteners 50, whereby the lower skin portion structure 20 and the upper skin portion structure 30 are fastened together (see FIG. 5).

Next, a method of manufacturing the wing box structure 10 will be explained hereunder. Since the manufacturing method according to the present embodiment comprises (1)

a step of manufacturing the lower skin portion structure 20 (lower skin portion structure manufacturing step), (2) a step of manufacturing the upper skin portion structure 30 (upper skin portion structure manufacturing step), and (3) a step of fastening the lower skin portion structure 20 and the upper skin portion structure 30 (upper/lower skin portion structures fastening step), such method will be explained in this order hereunder.

(1) Lower Skin Portion Structure Manufacturing Step

The present step is the step of manufacturing integrally the lower skin portion structure 20. First, the front spar 22 and the rear spar 23 having the rib posts, and the lower stringers 24 are fabricated by primarily curing the thermosetting resin. Respective parts that are fabricated by this step are fully cured by pressurizing/heating in the curing/molding steps described later (see FIG. 1 and FIG. 2).

The front spar 22, the rear spar 23, and the lower stringers 24 can be fabricated by employing the resin—impregnating curing method such as the RTM method or the RFI method. More particularly, they can be fabricated by arranging a dry preform (made of the reinforced fiber) on a predetermined lower molding jig, then covering a resultant surface with a bagging film, then introducing the above particular thermosetting resin into the covered portion such that the dry preform is impregnated with the thermosetting resin, and then primarily curing such dry preform by virtue of the pressurizing/heating (the RTM method). Otherwise, they can be fabricated by laminating sequentially a thermosetting resin film and the dry preform on the predetermined lower molding jig, then covering a resultant surface with the bagging film, then melting the thermosetting resin film by virtue of the pressurizing/heating such that the dry preform is impregnated with the thermosetting resin, and then primarily curing such dry preform (the RFI method).

Also, the front spar 22, the rear spar 23, and the lower stringers 24 can be fabricated by employing the prepreg laminating method. More particularly, they can be fabricated by the approach of laminating prepregs (i.e., thin plate members in which bundles of reinforced fibers are impregnated with the thermosetting resin in the uncured state) of the front spar, the rear spar, and the lower stringers on the predetermined lower molding jig by a predetermined thickness and then pressurizing/heating such prepregs to primarily cure them.

As the kinds of the reinforced fibers constituting the above dry perform and the prepreg, there may be listed the glass fiber, the carbon fiber, the aramid fiber, the alumina fiber, etc. Also, assume that the particular thermosetting resin that can be cured in two steps is employed in this step. In the present embodiment, the primarily curing conditions are set to three hours at 110° C.

Then, the lower skin prepreg is laminated on the lower molding jig that has the surface shape of the under surface of the main wing (lower skin prepreg laminating step). If the lower molding jig has the stiffness/the heat resistance that can stand the pressurizing/heating in the curing/molding steps described later, no limitation is imposed to the material of the lower molding jig. As the thermosetting resin constituting the prepregs employed herein, there may be listed the epoxy resin, the phenol resin, the bridged polyethylene, the polyimide, etc. In particular, the epoxy resin is preferable.

Then, the front spar 22, the rear spar 23, and the lower stringers 24 are arranged on the lower skin molding prepreg via an adhesive. The adhesive employed at this time is the thermosetting adhesive that is formed based on the epoxy resin, the phenol resin, etc., which can be cured by the heating in the curing/molding steps described later. The mode of the adhesive may be prepared like the film, the liquid, the powder, etc., but the film-like adhesive is preferable since such adhesive is easy to handle and is stable in quality. In this case, the shapes of the primarily-cured parts are never deformed by this step.

Then, lower rib chord prepregs 25' are formed (lower rib chord prepreg forming step). At this time, a rib chord jig that is different from the above under surface molding jig is prepared, and then the lower rib chord prepregs 25' are formed by laminating the prepregs, which have the sheet number necessary to mold the lower rib chords 25, on this rib chord jig.

Figure 3:
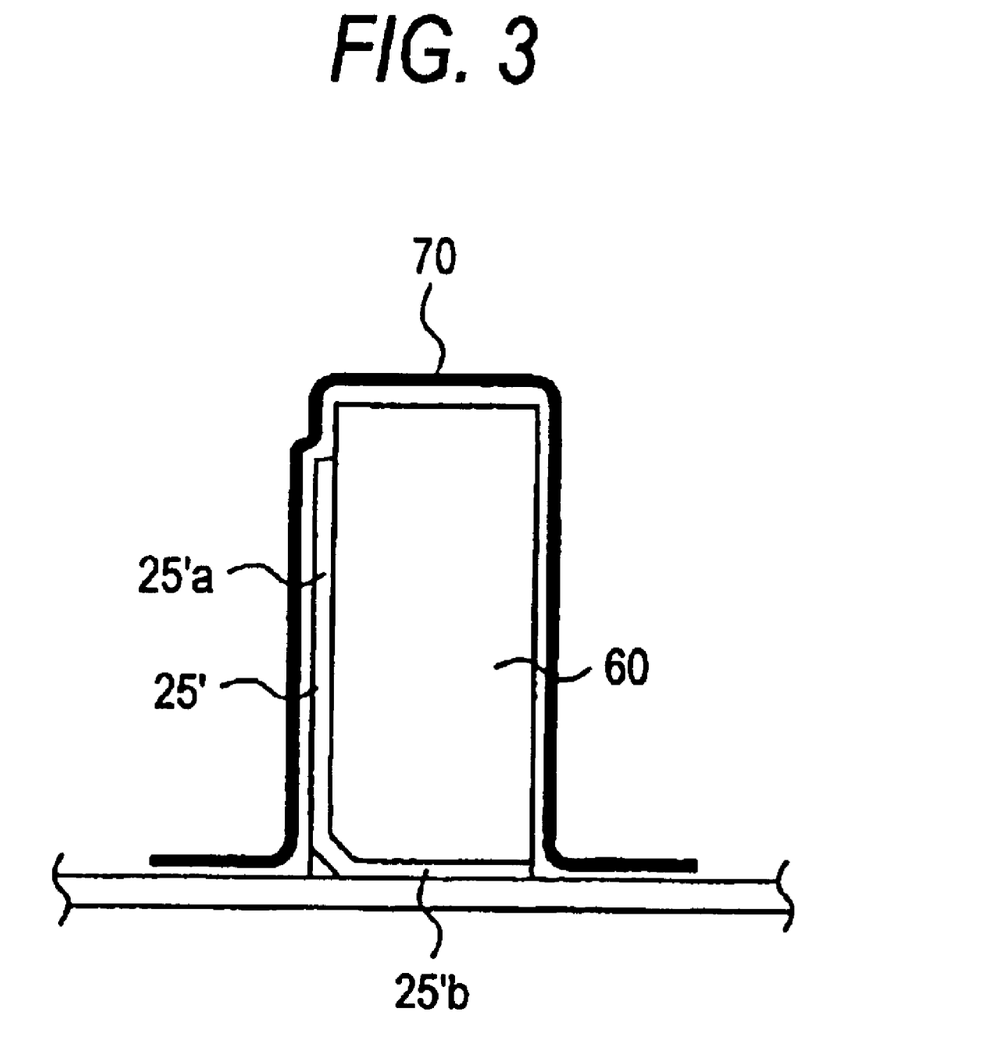
FIG. 3 is a side view showing a composite material wing box structure manufacturing method according to the embodiment of the present invention to show a jig employed in curing an lower rib chord prepreg.
Figure 4A:
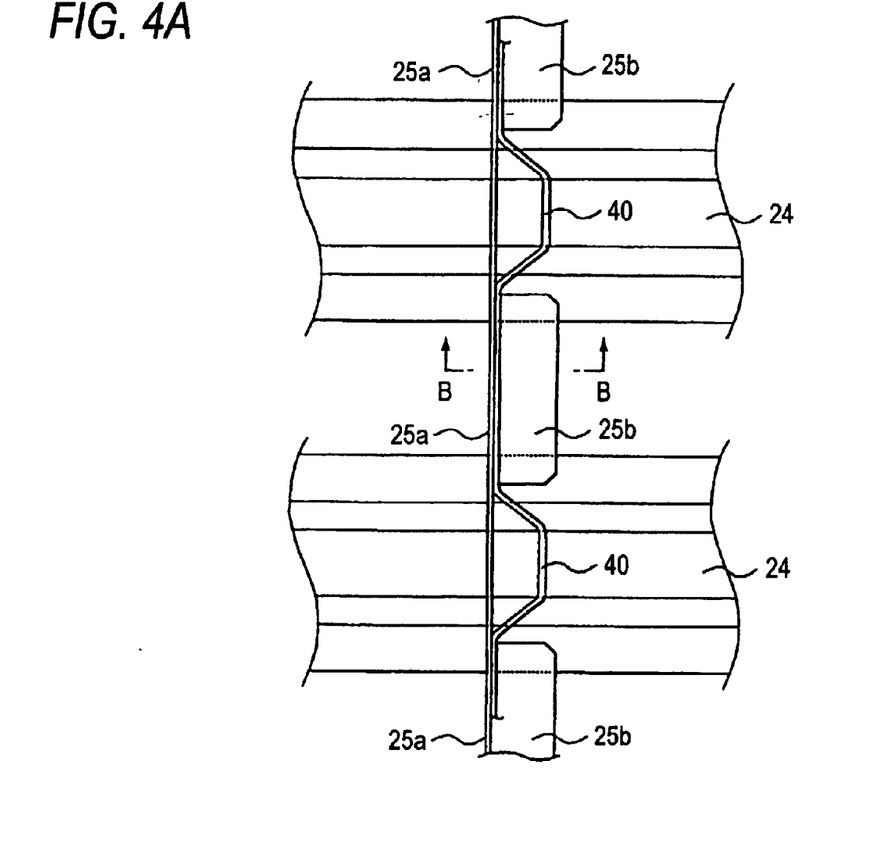
FIG. 4A is a view showing the lower skin portion structure shown in FIG. 2 from the top.
Figure 4B:
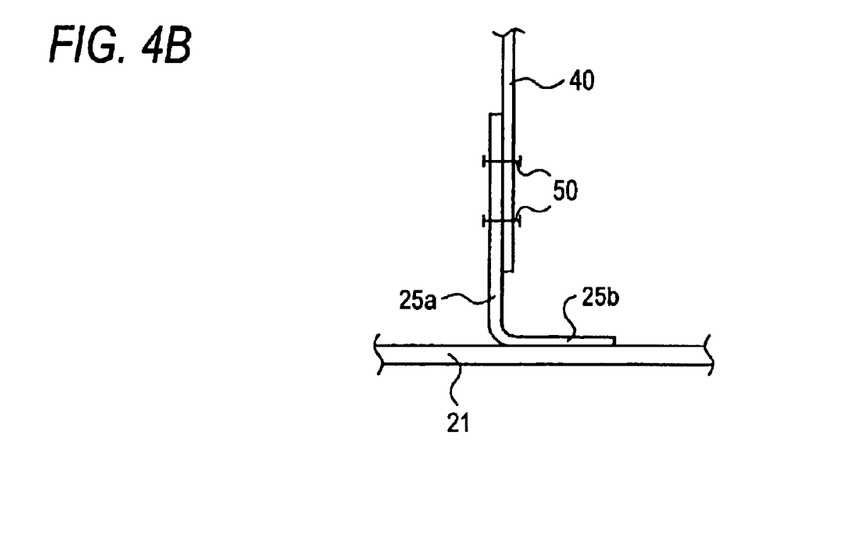
FIG. 4B is an enlarged view taken along a B—B portion in FIG. 4A.

As shown in FIG. 3, the lower rib chord prepreg 25' has a vertical portion part 25'*a* and horizontal portion parts 25'*b*. As shown in FIG. 4A, the horizontal portion parts 25'*b* are cured/molded in the state that such parts are brought into contact with the lower skin prepreg and the lower stringers 24, to thus constitute horizontal portions 25*b*. Also, as shown in FIG. 4B the vertical portion part 25'*a* is cured/molded to constitute a vertical portion 25*a* that functions as the fastening portion to the ribs 40.

Then, the prepared lower rib chord prepreg 25' is arranged between the rib posts 22*c*, 23*c* of the front spar 22 and the rear spar 23 and on the lower skin prepreg over the lower stringers 24 via the adhesive.

Then, the lower skin prepreg, the front spar 22, the rear spar 23, the lower stringers 24, and the lower rib chord prepreg 25' are covered with a covering device (covering step). This lower rib chord prepreg 25' does not have the stiffness that the front spar 22, the rear spar 23, and the lower stringers 24 have. Also, in order to mold the lower rib chords 25 so as to fit to the inner shape of the lower skin 21, a rib chord supporting jig 60 for supporting the vertical portion part 25'*a* of the lower rib chord prepreg 25' is arranged on the horizontal portion parts 25'*b*, and then the outer sides of the vertical portion part 25'*a* and the rib chord supporting jig 60 are covered with a rib chord bagging film 70 (see FIG. 3). Then, the entirety of the lower skin prepreg, the front spar 22, the rear spar 23, the lower stringers 24, and the lower rib chord prepreg 25' are covered. As the covering device, there may be listed the bagging film, the rubber molding bag, etc.

Then, the lower skin portion structure 20 is formed integrally by pressurizing/heating the portions that are covered with the covering device while exhausting them (curing/molding step). This pressurizing/heating step can be applied by employing the autoclave or the oven. In this step, the adhesion of the front spar 22, the rear spar 23, the lower stringers 24, and the lower rib chord prepreg 25' to the lower skin prepreg, the curing of the lower skin prepreg and the lower rib chord prepreg 25', and the full curing of the front spar 22, the rear spar 23, and the lower stringers 24 can be carried out simultaneously.

(2) Upper Skin Portion Structure Manufacturing Step

The present step is the step of manufacturing integrally the upper skin portion structure 30. In the present step, the explanation about portions that are substantially identical to the above lower skin portion structure manufacturing step will be omitted hereunder.

First, the upper stringers are fabricated by primarily curing the thermosetting resin. The upper stringers that are fabricated by this step are fully cured by pressurizing/heating in the curing/molding step described later. Then, the upper skin prepreg is laminated on the upper molding jig that has the surface shape of the top surface of the main wing (upper skin prepreg laminating step), and then the upper stringers are arranged on the upper skin prepreg via the adhesive.

Then, the upper rib chord prepreg is formed (upper rib chord prepreg forming step). Although not shown, like the lower rib chord prepreg 25', the upper rib chord prepreg has the vertical portion part and the horizontal portion parts. The vertical portion is cured/molded and functions as the fastened portion to the ribs 40.

Then, the upper rib chord prepreg is arranged on the upper skin prepreg via the adhesive while avoiding the upper stringers, then the upper skin prepreg, the upper stringers, and the upper rib chord prepreg are covered with the covering device (covering step), and then the upper skin portion structure 30 is molded integrally by pressurizing/heating while exhausting the portions that are covered with the covering device (curing/molding step).

(3) Upper/Lower Skin Portion Structures Fastening Step

The present step is the step of fastening the lower skin portion structure 20 and the upper skin portion structure 30. First, the ribs 40 serving as the strength member that fastens the lower skin portion structure 20 and the upper skin portion structure 30 are fabricated (rib fabricating step). The ribs 40 are formed of the composite material or the metal. If the ribs 40 are prepared by the composite material, they can be manufactured by employing the resin-impregnating curing method such as the RTM method, the RFI method, or the like. In this case, since the high rigidity is required of the ribs 40 as the strength member, the fully-cured ribs are employed.

Then, the ribs 40 are fastened to the rib posts 22c (23c) of the front spar 22 (rear spar 23) and the lower rib chords 25 in the lower skin portion structure 20 by the fasteners 50 (first rib fastening step: see FIG. 3 and FIG. 4B). Then, the lower skin portion structure 20, to which the ribs 40 are fastened, and the upper skin portion structure 30 are fastened at the front/rear spar portions by the fasteners (upper/under skins fastening step). Then, the upper rib chords 35 of the upper skin portion structure 30 are fastened to the ribs 40, which are coupled to the lower skin portion structure 20, by the fasteners 50 (second rib fastening step). In this second rib fastening step, the operator enters into closed spaces, which are formed between the lower skin portion structure 20 and the upper skin portion structure 30, from access holes 21a (see FIG. 1), which are formed in the lower skin 21 of the lower skin portion structure 20, and then executes the fastening operation via the fasteners. Also, the sealant is coated between the front/rear spars and the upper skin by using the access holes 21a.

In this case, as showing in FIG. 1, a wing thickness of the main wing of the aircraft according to the present embodiment is reduced toward the wind tip side. Therefore, the ribs 40 are not arranged near the wing tip portion, and a height of the lower rib chords 25 of the lower skin portion structure 20 is previously set high. Thus, the upper rib chords 35 of the upper skin portion structure 30 are directly fastened to the high lower rib chords 25 by the fasteners 50 (see FIG. 5).

According to above steps, the wing box structure 10 of the main wing can be manufactured. Then, the leading edge portion, the trailing edge portion, the aileron, the flap, etc. of the main wing, which are manufactured separately, are fitted to this wing box structure 10 to construct the main wing of the aircraft.

According to the manufacturing method of the present embodiment, there are provided the step of manufacturing the front spar 22, the rear spar 23, the lower stringers 24, the lower skin prepreg, and the lower rib chord prepreg 25', which are primarily cured, by virtue of the so-called co-bonding method and also the step of manufacturing the upper skin portion structure 30 by using the upper stringers, the upper skin prepreg, and the upper rib chord prepreg, which are primarily cured, by virtue of the so-called co-bonding method. Therefore, the time and labor that are required for manufacturing/preparing separately the parts such as the lower skin 21, the upper skin 31, the front spar 22, the rear spar 23, the lower stringers 24, the upper stringers 34, etc., which have the different curing process, can be reduced. As a result, the production cycle can be reduced considerably.

Also, according to the manufacturing method of the present embodiment, there is provided the step of manufacturing the lower skin portion structure 20 and the upper skin portion structure 30 by the so-called co-bonding method not to execute the fastening operation between the parts via the fasteners or the adhesion between the parts. Therefore, because of the flexibility of the prepregs, the clearances are never generated in the fastened portions between respective manufactured parts, for example, the fastened portion between the front spar 22 and the lower skin 21, the fastened portion between the lower skin 21 and the lower stringers 24, etc.

Accordingly, the operation of fastening respective parts by the fasteners, the sealing process of filling the clearances in the fastened portions between respective parts, the operation of repairing the shapes of respective parts in vicinity of the fastened portions, the operation of adhering respective parts by the adhesive, and the operation of filling the clearances in the fastened portions between the parts by the adhesive can be eliminated. Therefore, the time and labor required for these operations can be reduced. As a result, the cost of production can be reduced considerably.

In addition, according to the manufacturing method of the present embodiment, there is no necessity to employ the special split core jigs when the lower skin portion structure 20 and the upper skin portion structure 30 are manufactured. Therefore, the cost of fabricating the special core jigs can be reduced. Also, the mold-releasing process of the special core jigs and the splitting/cleaning operations of the special core jigs can be omitted. As a result, the cost of production can be reduced.

Furthermore, according to the manufacturing method of the present embodiment, the front spar 22 and the rear spar 23 having the rib posts (22c, 23c), the lower skin portion structure 20 having the lower rib chords 25, and the upper skin portion structure 30 having the upper rib chords 35 are employed. Therefore, the lower skin portion structure 20 and the upper skin portion structure 30 can be fastened by employing these rib posts (22c, 23c), the lower rib chords 25, and the upper rib chords 35 as the fastening portions to the ribs 40. As a result, the manufacturing steps can be simplified.

According to the invention set forth in The first aspect of the present invention, there are provided the step of manufacturing the front/rear spars, the lower stringers, the lower skin prepreg, and the lower rib chord prepreg, which are primarily cured, by virtue of the so-called co-bonding method and also the step of manufacturing the upper skin portion structure by using the upper stringers, the upper skin prepreg, and the upper rib chord prepreg, which are primarily cured, by virtue of the so-called co-bonding method. Therefore, the time and labor that are required for manufacturing/preparing separately the parts such as the under/upper skins, the front/rear spars, the rib chords, etc., which have the different curing process, can be reduced. As a result, the production cycle of the composite material wind can be reduced considerably.

Also, according to the invention set forth in The first aspect of the present invention, there are provided the step of manufacturing the front/rear spars, the lower stringers, the lower skin prepreg, and the lower rib chord prepreg, which are primarily cured, by virtue of the so-called co-bonding method and also the step of manufacturing the upper skin portion structure by using the upper stringers, the upper skin prepreg, and the upper rib chord prepreg, which are primarily cured, by virtue of the so-called co-bonding method. Therefore, because of the flexibility of the prepregs, the clearance is never generated in the fastened portions between respective manufactured parts, for example, the fastened portions between the front/rear spars and the skins, the fastened portions between the stringers and the skin, the fastened portions between the skins and the prepregs, etc.

Accordingly, the operation of fastening respective parts by the fasteners, the sealing process of burying the clearances in the fastened portions between respective parts, the operation of repairing the shapes of respective parts near the fastened portions, the operation of adhering respective parts by the adhesive, and the operation of filling the clearances in the fastened portions between the parts by the adhesive can be eliminated. Therefore, the time and labor required for these operations can be reduced. As a result, the cost of production of the composite material wing can be reduced considerably.

In addition, according to the invention set forth in The first aspect of the present invention, there are provided the step of manufacturing the front/rear spars, the lower stringers, the lower skin prepreg, and the lower rib chord prepreg, which are primarily cured, by virtue of the so-called co-bonding method and also the step of manufacturing the upper skin portion structure by using the upper stringers, the upper skin prepreg, and the upper rib chord prepreg, which are primarily cured, by virtue of the so-called co-bonding method. Therefore, there is no necessity to employ the special split core jigs when the lower skin portion structure and the upper skin portion structure are manufactured. Accordingly, the cost of fabricating the special split core jigs can be reduced. Also, the mold-releasing process of the special core jigs and the splitting/cleaning operations of the special split core jigs can be omitted. As a result, the cost of production of the composite material wing can be reduced extremely.

Further, according to the invention set forth in The first aspect of the present invention, there are provided the step of manufacturing the front/rear spars having the rib posts and the lower skin portion structure and the upper skin portion structure having the rib chords and also the step of fastening the lower skin portion structure and the upper skin portion structure by using the rib posts and the rib chords as the fastening portions to the ribs. Therefore, the step of manufacturing the composite material wing can be simplified considerably.

According to the invention set forth in The second aspect of the present invention, not only the advantages of the invention set forth in The first aspect of the present invention can also be achieved, but also the high quality front/rear spars can be effectively manufactured since the RTM method or the RFI method is employed without the employment of the prepreg when the front spar and the rear spar are to be molded in the primarily cured state. As a result, the high quality composite material wing can be effectively manufactured.

What is claimed is:

1. A method of manufacturing a composite material wing comprising:

a lower skin portion structure manufacturing step of manufacturing a lower skin portion structure that contains a lower skin, a front spar, a rear spar, a lower stringer and a lower rib chord for stiffening the lower skin;

an upper skin portion structure manufacturing step of manufacturing an upper skin portion structure that contains an upper skin, an upper stringer and an upper rib chord for stiffening the upper skin; and an upper and lower skin portion structure fastening step of fastening the lower skin portion structure and the upper skin portion structure;

wherein the lower skin portion structure manufacturing step includes, a front spar molding step of molding a front spar, which has at least one front rib post that projects toward a wing rear side at predetermined position by primarily curing a thermosetting resin, a rear spar molding step of molding a rear spar, which has at least one rear rib post that projects toward a wing front side at position opposing to the predetermined position by primarily curing the thermosetting resin, a lower stringer molding step of molding the lower stringer for stiffening the lower skin by primarily curing the thermosetting resin, a lower rib chord prepreg laminating step of laminating a lower rib chord prepreg that is provided vertically along an inner shape of the lower skin in a chord direction at wing positions at which the rib post is positioned, a lower skin prepreg laminating step of laminating a lower skin prepreg on a lower molding jig that has a shape corresponding to an underside surface of the wing, an arranging step of arranging the front spar, the rear spar, the lower stringer, and the lower rib chord prepreg on the lower skin prepreg via an adhesive respectively, a covering step of covering the lower skin prepreg, the front spar, the rear spar, the lower stringer, and the lower rib chord prepreg with a covering device, and a curing and molding step of exhausting, pressurizing, and heating portions that are covered with the covering device, the upper skin portion structure manufacturing step includes, an upper stringer molding step of molding the upper stringer for stiffening the upper skin by primarily curing the thermosetting resin, an upper rib chord prepreg laminating step of laminating upper rib chord prepreg that is provided vertically along an inner shape of the upper skin in the chord direction at wing position at which the rib post is positioned, an upper skin prepreg laminating step of laminating an upper skin prepreg on an upper skin jig having an upper surface shape of the wing, an arranging step of arranging the upper stringer and the upper rib chord prepreg on the upper skin prepreg via the adhesive, a covering step of covering the upper skin prepreg, the upper stringer, and the upper rib chord prepreg with the covering device, and a curing and molding step of exhausting, pressurizing, and heating portions that are covered with the covering device, and the upper and lower skin portion structures fastening step includes, a rib fabricating step of fabricating ribs each having a predetermined shape by a composite material or a metal, a first rib fastening step of fastening the ribs to the front rib post and the rear rib post and the lower rib chords of the lower skin portion structure by a mechanical fastening device, an upper and lower fastening step of fastening spars of the lower skin portion structure, to which the ribs are coupled, to the skin of the upper skin portion structure by the mechanical fastening device, and a second rib fastening step of fastening the ribs to the upper rib chords of the upper skin portion structure by mechanical fastening device.

2. The a method of manufacturing a composite material wing according to claim 1, wherein the front spar and the rear spar that molded in the primarily-cured state are manufactured by an RTM method and an RFI method.

3. A composite material wing comprising:

a front spar and a rear spar;

a lower skin that is jointed integrally to the front spar and the rear spar by an adhering device;

an upper skin that is fastened to the front spar and the rear spar by mechanical fastening device;

a plurality of stringers that are jointed integrally to inner surfaces of the lower skin and the upper skin by the adhering device to extend in a wing span direction; and ribs that are fastened to members that are integrally jointed to the front spar, the rear spar, the lower skin, and the upper skin respectively by mechanical fastening device;

wherein the members include a plurality of rib posts provided to the front spar and the rear spar, and a plurality of rib chords extending in the chordwise direction of the upper skin and the lower skin, and aligned in the spanwise direction of the wing.

* * * * *